United States Patent
Heddon

[11] 3,884,807
[45] May 20, 1975

[54] APPARATUS FOR SKIMMING IN MULTI-PHASE FLUID MEDIA

[76] Inventor: Merlyn W. Heddon, 8912 Victoria Ave., South Gate, Calif. 90280

[22] Filed: Oct. 18, 1971

[21] Appl. No.: 190,082

Related U.S. Application Data

[63] Continuation-in-part of Ser. No. 29,783, April 20, 1970, abandoned.

[52] U.S. Cl. .......... 210/104; 210/242; 210/DIG. 21
[51] Int. Cl. .......................................... E02b 15/04
[58] Field of Search ....... 210/83, 97, 104, 112, 114, 210/115, 242, DIG. 21

[56] References Cited
UNITED STATES PATENTS

| | | | |
|---|---|---|---|
| 1,591,024 | 7/1926 | Dodge | 210/242 |
| 2,826,306 | 3/1958 | Burns | 210/115 X |
| 2,876,903 | 3/1959 | Lee | 210/242 |
| 3,088,592 | 5/1963 | Clark | 210/114 |
| 3,219,190 | 11/1965 | Thune | 210/242 |
| 3,259,720 | 9/1970 | Chablaix | 337/348 |
| 3,375,928 | 4/1968 | Chase | 210/96 X |
| 3,630,376 | 12/1971 | Price | 210/242 |
| 3,662,892 | 5/1972 | Sorensen | 210/242 |
| 3,700,108 | 10/1972 | Richards | 210/242 |
| 3,708,070 | 1/1973 | Bell | 210/242 |

*Primary Examiner*—Thomas G. Wyse
*Attorney, Agent, or Firm*—C. Lauren Maltby; Norman L. Chalfin

[57] ABSTRACT

A skimmer vessel is disclosed for collecting, automatically concentrating, and storing an upper phase of a two-phase liquid system such as oil floating upon water. A mechanically positioned entrance lip brings in a mixture of the two phases to a settling and collection zone. Within one or more settling zones connected in series electrical phase detection systems are used to facilitate optimum concentration of phases. The electrical systems automatically position weir gates and engage pumps for control of the phase separation. It is possible to operate the vessel under varying conditions, for example at low inlet rate provided by wave action, also at higher flow rates provided by mechanical pumping means or higher vessel surface velocities.

1 Claim, 15 Drawing Figures

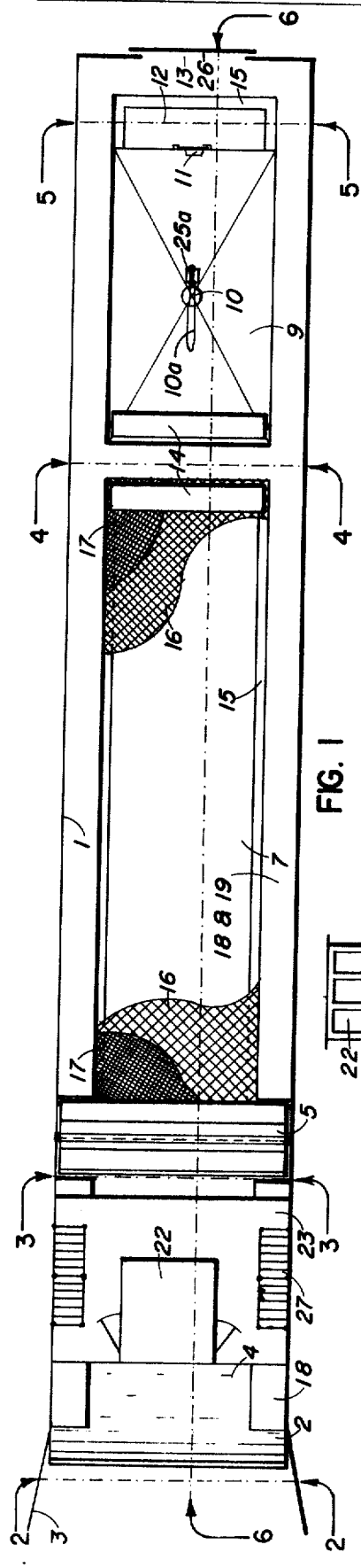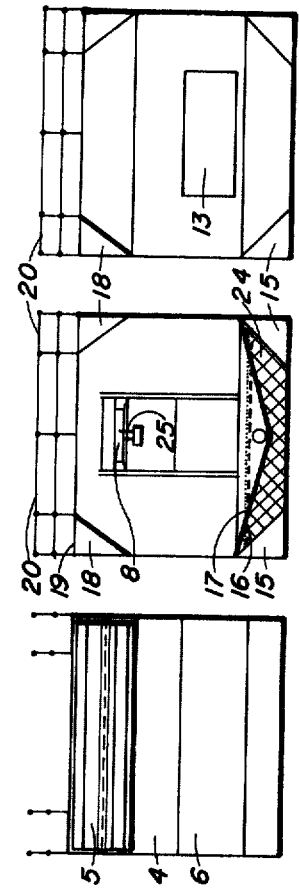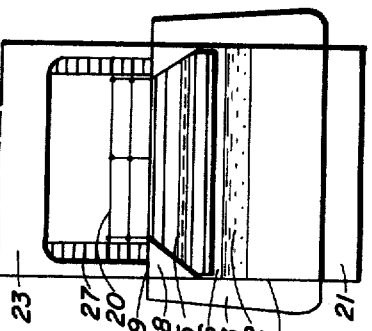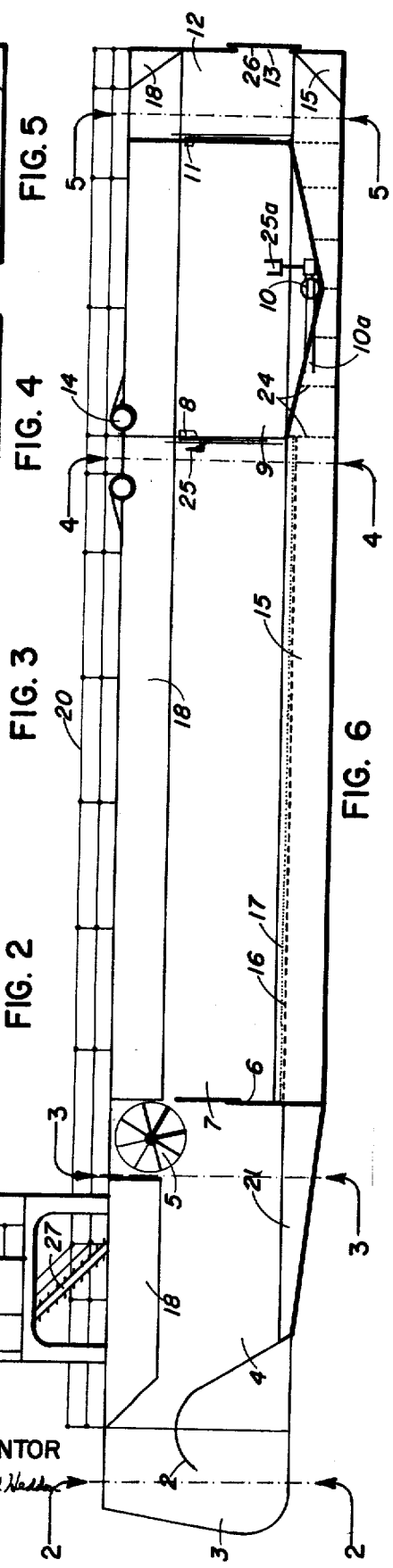

3,884,807
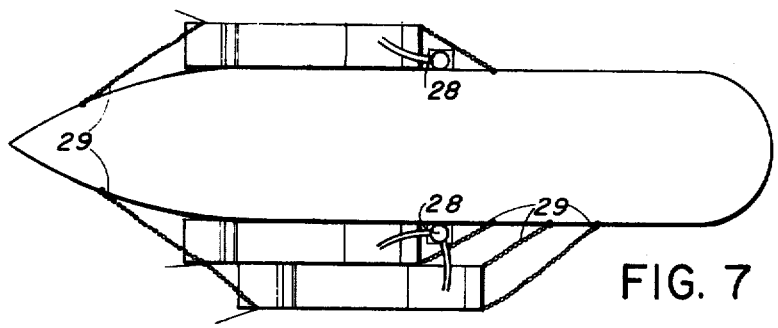
FIG. 7
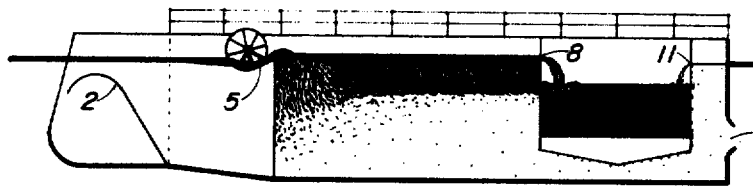
FIG. 8
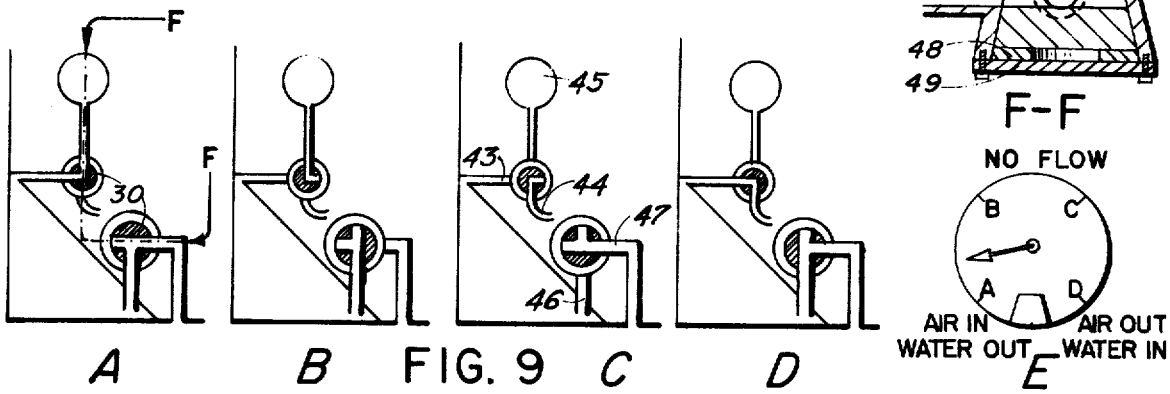
FIG. 9
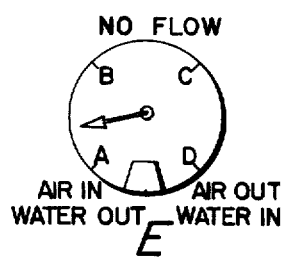
F-F
A   B   C   D
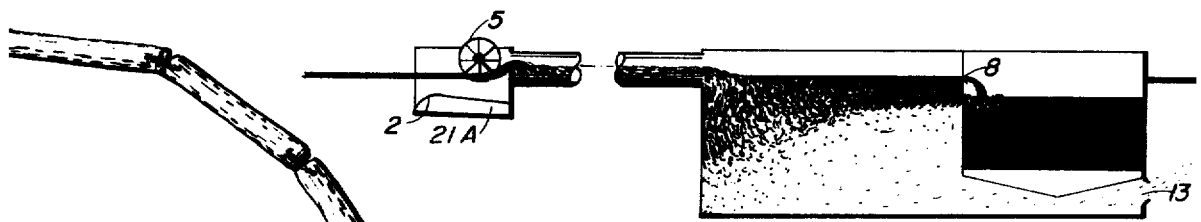
FIG. 10
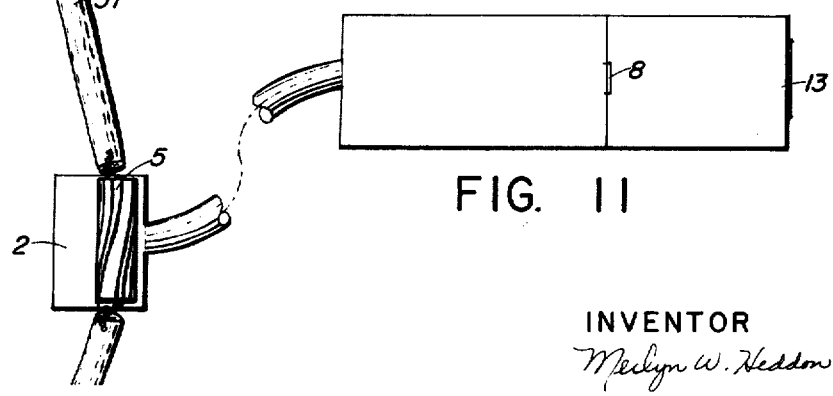
FIG. 11
INVENTOR
Merlyn W. Heddon

MERLYN W. HEDDON
INVENTOR 3,884,807

APPARATUS FOR SKIMMING IN MULTI-PHASE FLUID MEDIA

BACKGROUND OF THE INVENTION

This application is a continuation-in-part of my application Ser. No. 29,783 filed Apr. 20th, 1970, now abandoned.

The invention relates to liquid storage and separation apparatus, and to a skimmer vessel incorporating a liquid storage and separation apparatus. More particularly, the invention relates to an automatically controlled skimmer vessel with an improved arrangement of separation zones and phase detection devices to facilitate location of the phase interface and hence to facilitate the ultimate physical separation of the two liquid phases.

DESCRIPTION OF THE PRIOR ART

Recovery of a liquid floating on the surface of water, for example oil floating on sea water, has been attempted by direct skimming vessels having inlet means and a single internal collection zone where entering flow rate and separation are determined by the speed of the vessel. While this procedure achieves a degree of separation, problems are encountered in obtaining adequate settling in a single separation chamber. After one settling stage the lower phase effluent invariably contains large amounts of upper phase liquid. When flow rate is controlled entirely by the speed of the skimmer vessel, higher speeds of operation may lead to extensive emulsification and phase remixing in the single collection zone. Thus a skimmer vessel with independent inlet pumping means and outlet pumping means has long been desired which is capable of maintaining a uniform freeboard at all times.

In certain cases the problems of separating two-phases in a single collection tank were sought to be solved by introduction of baffles into the tank in the hope that intermixing of the phases would be reduced at high entering and exit fluid velocities. In general, problems introduced by the baffles rendered these attempts unsuccessful. Multiple baffles, for example require separate phase rejection ports. High viscosity oil tends to coat large surface areas such as baffles with large amounts of viscous material. Internal venting is necessary for maximum efficiency and loading of baffles making them highly unsatisfactory.

SUMMARY OF THE INVENTION

The present invention provides an improved skimmer vessel for the recovery and concentration of the upper phase of a two phase liquid system floating in the vicinity of the vessel. The vessel according to the invention collects, automatically concentrates and stores oil floating on the surface of the water in which the vessel is floated. The skimmer vessel includes mechanisms for maximizing the removal of oil from the surface of the water by precision adjustments. The precision of adjustments is the result of electrodes of novel design which identify the phase and operate automatic control apparatus to adjust weirs and operate pumps permitting the ready collection of the desired phase and discharge of the unwanted phase of the two phase liquid system being separated by the skimmer vessel. Additionally the vessel may also be used as a cargo storage vessel when not being used for oil skimming operations.

According to the invention a two-phase liquid is processed and separated into individual phases by moving the improved skimming vessel across the surface of the liquid mixture in such a manner as to introduce a large quantity of upper phase liquid and a minimum quantity of lower phase liquid. A mechanically controlled collecting lip serves as an inlet to a first separation and settling zone. Separation occurs continuously in the first settling zone, fitted with dual outlets for each phase, and as separate phases pass to the outlet end the effluent flow rate of these separate streams is under the control of apparatus operated by phase interface sensors located at appropriate levels in the settling zone. The control apparatus is turned on and off by the action of a "salt-bridge" conductivity path between the interface sensors and the body of the vessel.

The novel sensors in the invention are included in the several settling zones of the vessel so that the control apparatus may further enrich and concentrate the oil which may be pumped off in a continuous stream to suitable storage vessels in an adjacent tanker.

BRIEF DESCRIPTIONS OF THE DRAWINGS

FIG. 1 is a plan view of a skimming vessel according to the invention;

FIG. 2 is a cross-sectional view through 2—2 of FIG. 1;

FIG. 3 is a cross sectional view through 3—3 of FIG. 1;

FIG. 4 is a cross sectional view through 4—4 of FIG. 1;

FIG. 5 is a cross sectional view through 5—5 of FIG. 1;

FIG. 6 is a longitudinal cross-section through 6—6 of FIG. 1;

FIG. 7 is a plan view of a tanker towing two vessels according to the invention on the port side and one on the starboard side of the tanker;

FIG. 8 is a simplified illustration of flow of the oil and water through the vessel in accordance with the invention;

FIG. 9 is an illustration of the four positions of a valve used in the operation of the invention;

FIG. 10 is an illustration of a modified vessel in which a collection unit is flexibly coupled with a separation and storage unit;

FIG. 11 is a plan view of an application of the invention in conjunction with a log dam barrier at an oil slick;

GENERAL DESCRIPTION

Figure 12:
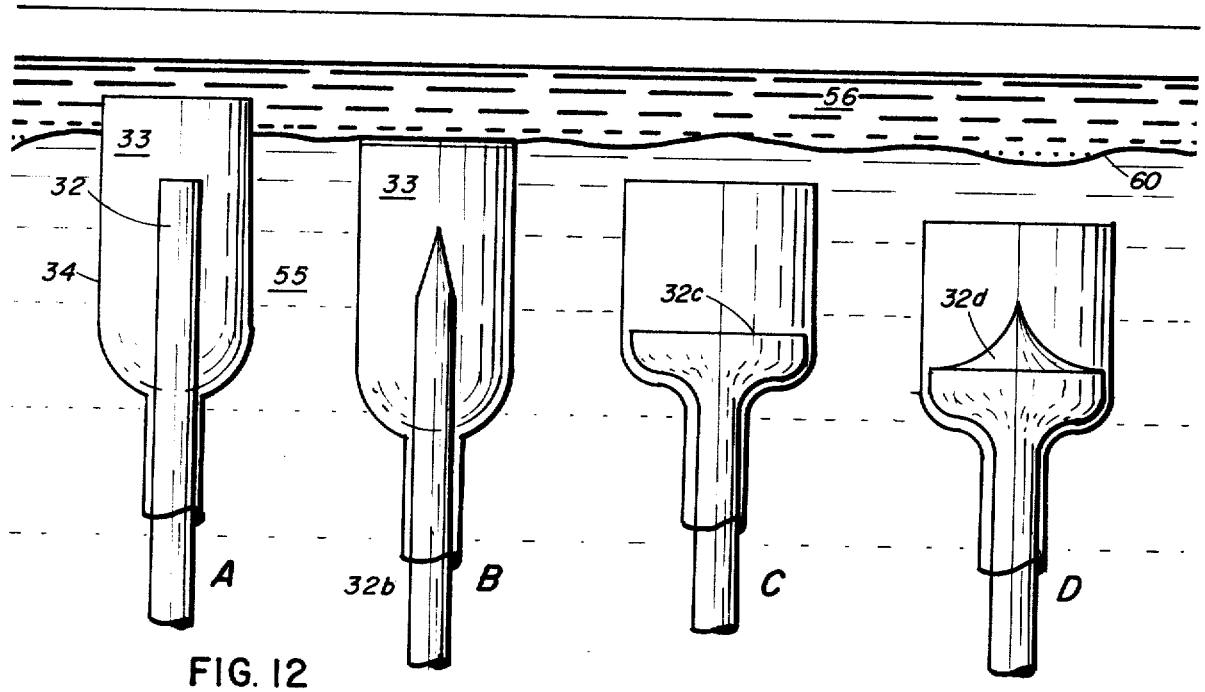
FIG. 12 shows several forms of electrodes employed as interface sensors in the practice of the invention.

In the description which follows it will be understood that when the term "oil" is used it is intended to refer to any substance floating upon the surface of the water, to include petroleum, crude oil, kerosene, as well as oil-soaked solids such as sawdust, plankton, kelp and the like.

In accordance with the present invention there is provided a versatile and improved skimmer vessel for recovery of oil floating on the surface of water. As is shown in FIG. 1 the vessel comprises a hull 1, a lip 2, ears 3, a collection zone 4, paddle 5, baffle 6, separation and settling zone 7, weir 8, storage and transfer zone 9, pump 10, aft weir 11, after separation zone 12 and exhaust port 13. In certain cases when volatile fractions are present in the oil a sealant hatch cover 14 of plastic or rubber may be desirable. Hull 1 is formed of steel plates welded together. Flotation zones 15, formed in the hull are suitably located transversely toward the bottom of hull 1. Zones 15 may be triangular in cross section as shown or may have any other configuration to accommodate air or other buoyant fluid.

Also in FIG. 1 a grating 16 is shown which is a floor to the structure and may be used optionally with grill 17 for further reenforcement. Upper flotation zones 18 are similarly formed in the hull for structural strength and serve also to prevent the vessel from tipping. A conventional catwalk 19 and guard rail 20 are provided. It will also be understood that conventional hollow bottom zones 21 and cabin zones 22 with work areas 23 are also provided.

Collection lip 2 is adjustable in height by way of conventional hinge means, not shown, which make it possible to change the angular position with respect to the floor by 180° from the position shown in FIG. 1 and in FIG. 6 to an angular position immediately below and adjacent to paddle 5. Suitable mechanical gears and hydraulic apparatus may be used to effect angular position changes in lip 2. The curved surface of lip 2 is intended to reduce mixing to a minimum as the oil with some water passes over. It can be appreciated that since the lip can be lowered in line with the oil-water interface or positioned just above or just below such interface, it becomes possible to maintain control of the total entrance flow rate and the relative quantity of oil and water entering the vessel by judicious positioning of the lip. The position of the lip in FIG. 6 shows the working position when skimming operations are in progress. Movement of the lip to an angular position closer to paddle 5 provides a convenient transportation position reducing frictional forces while the vessel is moving toward a scene of operations where oil has spilled on the water.

Ears 3 on the skimmer vessel provide for the bow wave effects of the towing vessel upon the skimmer vessel while the vessel for skimming is being towed to its working location. Ears 3 form a rough seal to the side of the towing vessel so that oil is forced around the bow of the vessel and directed into a proper location for the oil to pass over the lip directly into collection section 4.

Paddle 5 may be a simple wooden paddle with radiating flat blade members as shown in FIGS. 1 and 6 or a more rugged metal device with oil scoop members in the form of cups or the like at the circumference of the paddle arrangement, the cups being disposed on radials extending from the paddle wheel hub. Paddle 5 and baffle 6 are adjusted to provide a steady inlet flow of the two phases of oily matter into the settling zones.

The volume of the separation and settling zone 7 is not critical, so long as sufficient volume is provided for adequate settling by simple gravity separation. Experience has shown that most oils will separate from water in a period of 5 to 30 minutes depending on the oil viscosity and other physical or chemical characteristics of the oil. Processing rate of oily material is initially determined by the angle of the entrance lip 2, which in cooperation with wiers 8 and 11, and other related pumping equipment, further described below, sets up an overall processing rate.

In accordance with the present invention a novel arrangement of electrodes 25 cooperates with a control circuit, discussed below to provide automatic control of the separate phase pumping systems and to control the level of weir 8 in such a manner as to retain a constant quantity of liquid in settling zone 7.

Various exemplary arrangements of the electrodes are shown in FIG. 12 wherein item A shows a typical electrode structure 32 encased in a cup 34 so that the flat top of electrode 32 is below the open end of cup 34. Within the area 33 of cup 34 fluid will collect, as further described in connection with FIG. 13, to make a connection with the water, which is conductive, when the cup 34 is immersed therein. As illustrated at FIG. 12 A, cup 34 however, has its open end in the oil area 56. Under this condition the electrode has no conductive path to the water 55 surrounding cup 34. The cup 34 of electrode unit shown in FIG. 12 B is not only surrounded by water 55 on the outside but by virtue of its complete immersion in the water and the fact that there is also the water in the cup as at 33 a water bridge or salt bridge is formed to any conductive area in contact with the water from the electrode 32b. Electrode 32b has a conical tip. In the C and D forms of electrodes shown in FIG. 12, a flat topped button 32c and a tear drop button 32d are shown, respectively. These are to illustrate the fact that the electrode configuration is a matter of choice. The principal reason for any of the designs is to facilitate the run off of oil after the electrode comes in contact with it should this occur. It should be noted, as above explained that in every case the electrode uppermost point is lower than the open edge of the insulative cup 34 surrounding it. Thus as the electrode is drawn downward into the water phase of the two phase liquid the oil, if any, in the cup will rise above the edge of the cup 34, floating away from it so that the water or salt bridge is completed.

In FIGS. 1, 4 and 6 electrode assembly 25 is shown as positioned on weir 8. Electrode assembly 25a is positioned in the lower portion of storage transfer section 9. The electrode assembly 25 controls the raising and lowering of the weir 8. Electrode assembly 25a controls the pump 10 operation for water discharge at pump outlet 10a.

Figure 13:
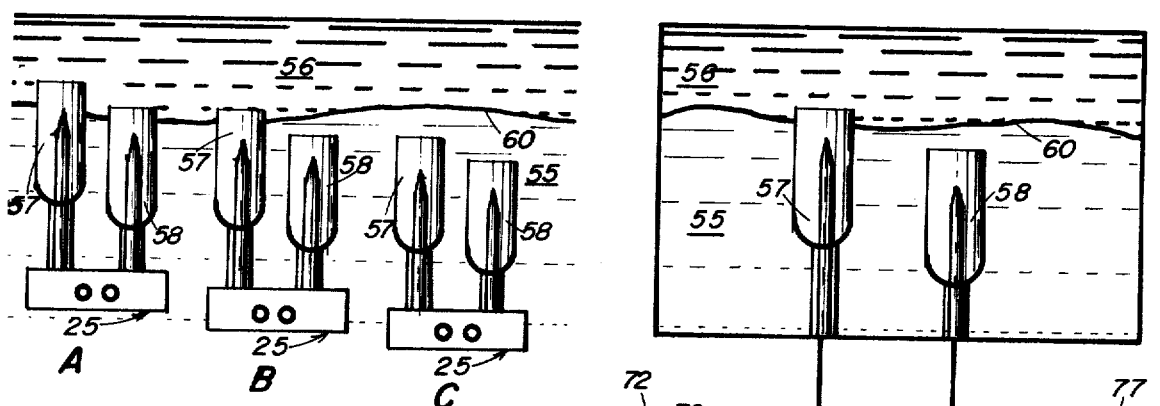
FIG. 13 is a view of representative electrodes showing three positions thereof in the operation thereof to control apparatus of the invention.

Referring now to FIG. 13 wherein three electrode assemblies 25 are shown at A B and C, respectively, the electrode assembly A illustrates each of a pair of electrodes 57,58 in the oil phase 56. At B in FIG. 13 electrode 57 is in the oil phase while electrode 58 is in the water phase 55. At C in FIG. 13 both electrodes 57 and 58 are in the water phase 55. While shown as three electrode assemblies the FIG. 13 sequence illustrates in fact three different positions of the same set of electrodes as they are immersed in water or oil phases during either the raising or lowering of the weir or during the filling or settling of oil into the compartment involved. The electrode assembly 25 is in fact attached to the weir 8 as shown in FIGS. 4 and 6.

Figure 14:
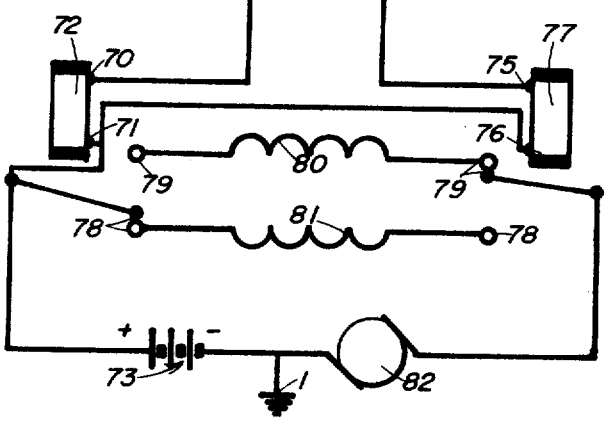
FIG. 14 is a circuit diagram showing how the electrodes operate weir motor controls in the invention.

To more fully follow how the electrode assemblies function in their automatic control action refer to the circuit diagram of FIG. 14. In the diagram electrodes 57 and 58 are shown in the same operational configuration as in B of FIG. 13. That is, electrode 57 is in the oil phase and electrode 58 is in the water phase 55. As has been previously pointed out that when the electrode as at 57 is in an oil phase as shown there is no conduction to the hull of the vessel. When, however, an electrode as at 58 is fully immersed in the water phase there is completely conductive path from the electrode element 32 within cup 34 to the hull via the water path 55 and the water in the cup at 33. Therefore any circuit completed through the water path from hull to electrode will be energized.

Referring now again to FIG. 14 note that electrode 57 is connected via an insulated lead to one terminal 70 of a solenoid relay coil 72. The other terminal 71 of the relay coil is connected to the positive terminal of a battery 73, representative of a variety of common power sources which could be used. The negative side of the battery 73 is connected to a ground or the hull of the vessel.

Similarly electrode 58 is connected through an insulated lead to a terminal 75 of a solenoid 77 the other terminal 76 thereof being connected to the positive battery terminal. It maybe seen therefore that relay 72 is not energized and relay 77 is energized. As a result contacts 78 on relay 72 are open while those on relay 76 at 79 are closed. Contacts 78 energize one of the coils of the field of a motor comprising field coils 80,81 and rotor 82. If field 80 is energized the motor moves on way if the field 81 is energized it moves in the opposite direction. For the purposes of this invention motor 80,81,82 operates weir 8 with field coil 80 raising the weir and field coil 81 lowering it. Field coil 81 will be energized when both solenoids are deenergized. Field coil 80 is energized when both solenoids are energized. Thus, when both electrodes 57,58 are immersed in water the weir is raised by the motor. When the electrodes are both in the oil phase the weir is lowered. In each instance the weir stops when one electrode is in the oil phase and the other in the water phase, the condition illustrated in FIG. 14.

Figure 15:
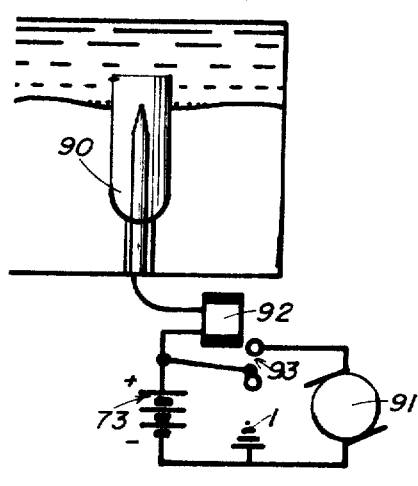
FIG. 15 illustrates in a circuit diagram how pump motors are controlled by the electrodes.

The contact condition illustrated in FIG. 15 using a single contact 90 to operate a motor for a pump 91, when the electrode is immersed in water electrode 90 completes the circuit to the hull for relay 92 so that contacts 93 energize motor 91. When the water oil interface 60 reaches the point where electrode 90 is in oil at the top of the cup thereof the pump motor 91 stops and no further pumping occurs until the water level again rises to immerse electrode 90.

The pumping action and the raising or lowering of a weir to which an electrode assembly is attached are thus automatically a function of the level in the collection or storage areas at which the oil water interface occurs.

There has been described hereinabove a system for the separation of oil from an oil water interface as in the case where a boat has lost oil or oil has seeped up from an undersea well. As the upper phase oil enters the skimming vessel over the lip 2 as described earlier it fills collection chamber 4 with a mixture, which as it moves toward baffle 6 and paddle wheel 5 tends to develop an interface so that the upper phase oil flows over baffle 6 assisted by the action of paddle 5. The oil is further separated from any mixture entering the separating and settling section 7 over baffle 6 developing an oil water interface near weir 8. The electrode assemblies 25 identify the interface operating the weir as hereinbefore described to encourage the pouring of only the oil phase over the top of the weir to the storage transfer section 9. A pump sensing electrode (25a in FIG. 1) operates a pump to exhaust water from chamber 9 when the electrode is fully immersed in the water phase. That is when the oil level in the chamber 9 is not very low in the chamber. When the oil has filled chamber 9 it is pumped by external means in the towing vessel into storage facilities of the towing vessel.

FIG. 7 shows several skimming vessels of the present invention in operational use in conjunction with a separate larger storage tanker. Two of the skimming vessels are on the port side and one is on the starboard side of the tanker. Chains 29 serve to attach the skimming vessel to the hull of the storage tanker. The tanker onboard pumps 28 are used for oil transfer.

FIG. 8 is a simplified longitudinal section through 6--6 of FIG. 1, also similar to FIG. 6, and shows the flow of oil and water through the skimming vessel. The mass of oil and water enters at collection lip 2. Thereafter liquid flows through paddle 5 to separation and storage zones defined by the walls of the vessel and weirs 8 and 11, where the oil remains while the water phase is removed at exhaust port 13.

FIG. 9 shows a prior art two-orifice valve having four positions for the control of the quantity of water and air in the flotation zones 15 in the vessel hull. The valve appears in cross-sectional view in FIG. 9-F. Separate metering positions of the valve stem are shown in FIGS. 9-A to 9-D, namely the air in, water out, water in, and air out positions, as monitored by the control panel of FIG. 9-E.

FIG. 10 in simplified cross-section shows an alternative embodiment of the skimming vessel in which a separate collection vessel comprising collection lip 2, paddle 5, and hollow bottom zone 21, is flexibly coupled to a larger vessel having separation and storage compartments as previously described.

FIG. 11 in simplified plan view shows an application of the FIG. 10 embodiment to a conventional log dam barrier formed of logs 31.

It will be understood that various other conventional features may be included in the skimmer vessel of this invention, and may not be shown in the figures in full detail in every case. For example baffles 24 may be used to provide a more devious path to the final separation chamber 12 Movable cover 26 may be included as a positive seal for port 13 when the vessel is not engaged in skimming operations. Auxiliary pumping equipment and back flow controls, not shown, would normally be desirable in varying the total effluent from port 13, and to prevent back flow of untreted liquid into the vessel.

What is claimed as new is:

1. A system for separation of the upper phase from the lower phase of a two-phase fluid medium, said system comprising:
 a towable skimming vessel having an inlet lip, a collection chamber adjoining said lip, a settling chamber adjoining said collection chamber, and a separation and storage chamber adjoining said settling chamber, said lip being adjustable to be positioned in the two phase fluid medium so as to substantially separate the upper phase from the lower phase thereof and to direct said upper phase fluid into said collection chamber;

a paddle means and a baffle means disposed at the end of said collection chamber, adjoining said lip, and positioned so as to further separate said upper phase fluid from said lower phase fluid and to further urge a substantial portion of said upper phase fluid over said baffle means into said settling chamber;

an adjustable weir positioned in said vessel so as to form a common barrier between said settling chamber and said separation and storage chamber; and automatic control means operatively disposed on said weir for adjusting the position of said weir to permit optimum flow of said upper phase fluid from said settling chamber into said separation and storage chamber, said automatic control means comprising:

a motor for moving the weir;

a source of power;

first electrode means including a pair of electrodes positioned on said weir, one higher than the other, and arranged to connect said motor to said source of power when said first electrode means is positioned above or below the interface between the upper and lower phase of said fluid medium in said settling chamber to lower or raise said weir, and arranged to disconnect said motor from said source of power when one of said electrodes in said electrode pair is above and the other electrode of said electrode pair is below said interface;

a pump having an outlet, said pump being positioned in the lower portion of said separation and storage chamber, and a motor for exciting said pump; and a second electrode means in the lower portion of said separation and storage chamber positioned to operate said pump motor so long as said second electrode means is in the lower phase of said fluid medium in said separation and storage chamber.

* * * * *